Mar. 3, 1925.

R. BERNHARD

CRUSHER

Original Filed Jan. 18, 1919    7 Sheets-Sheet 2

1,528,316

Inventor:
Richard Bernhard,
by Spear, Middleton, Donaldson &c.
Attys.

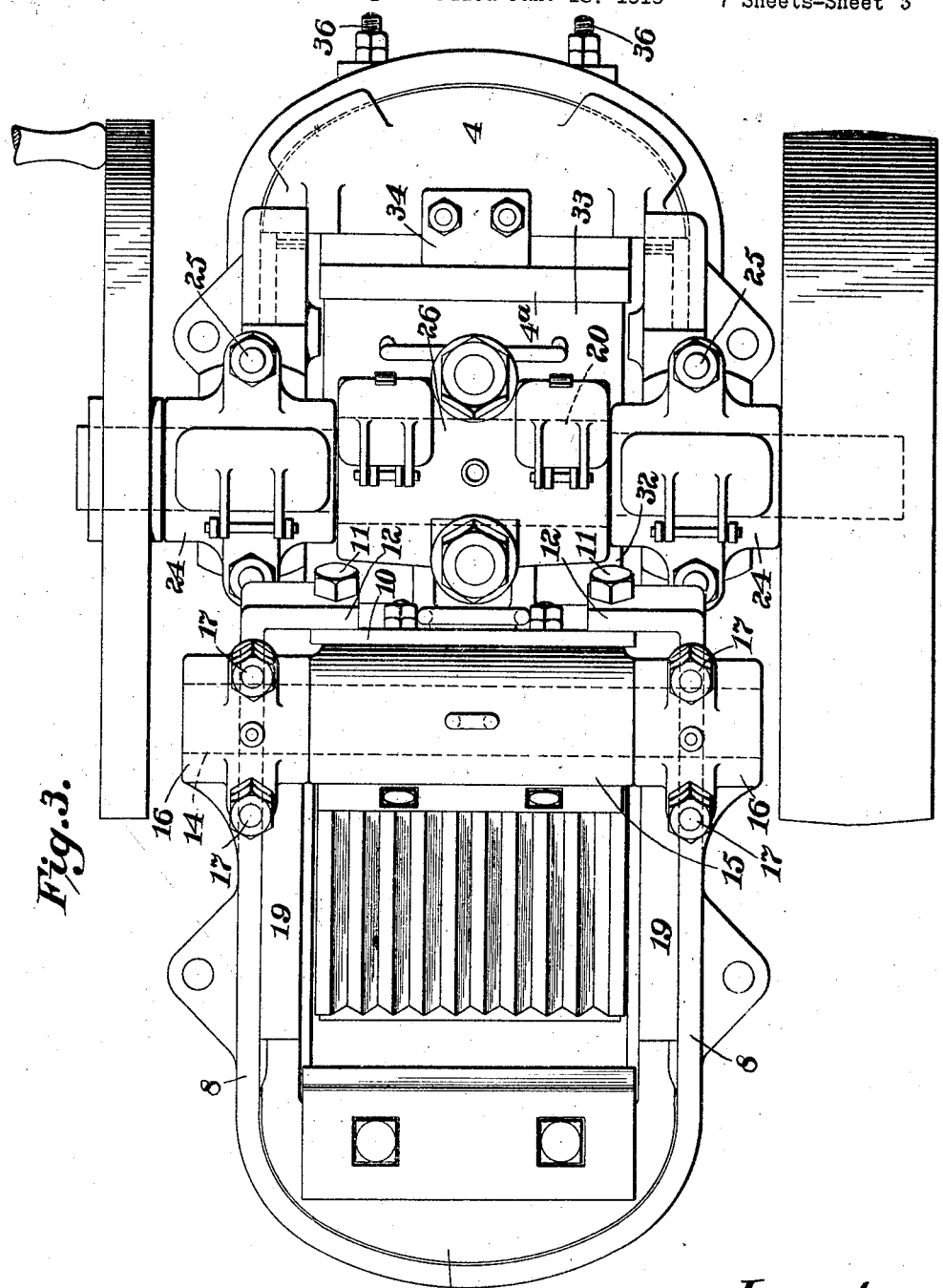

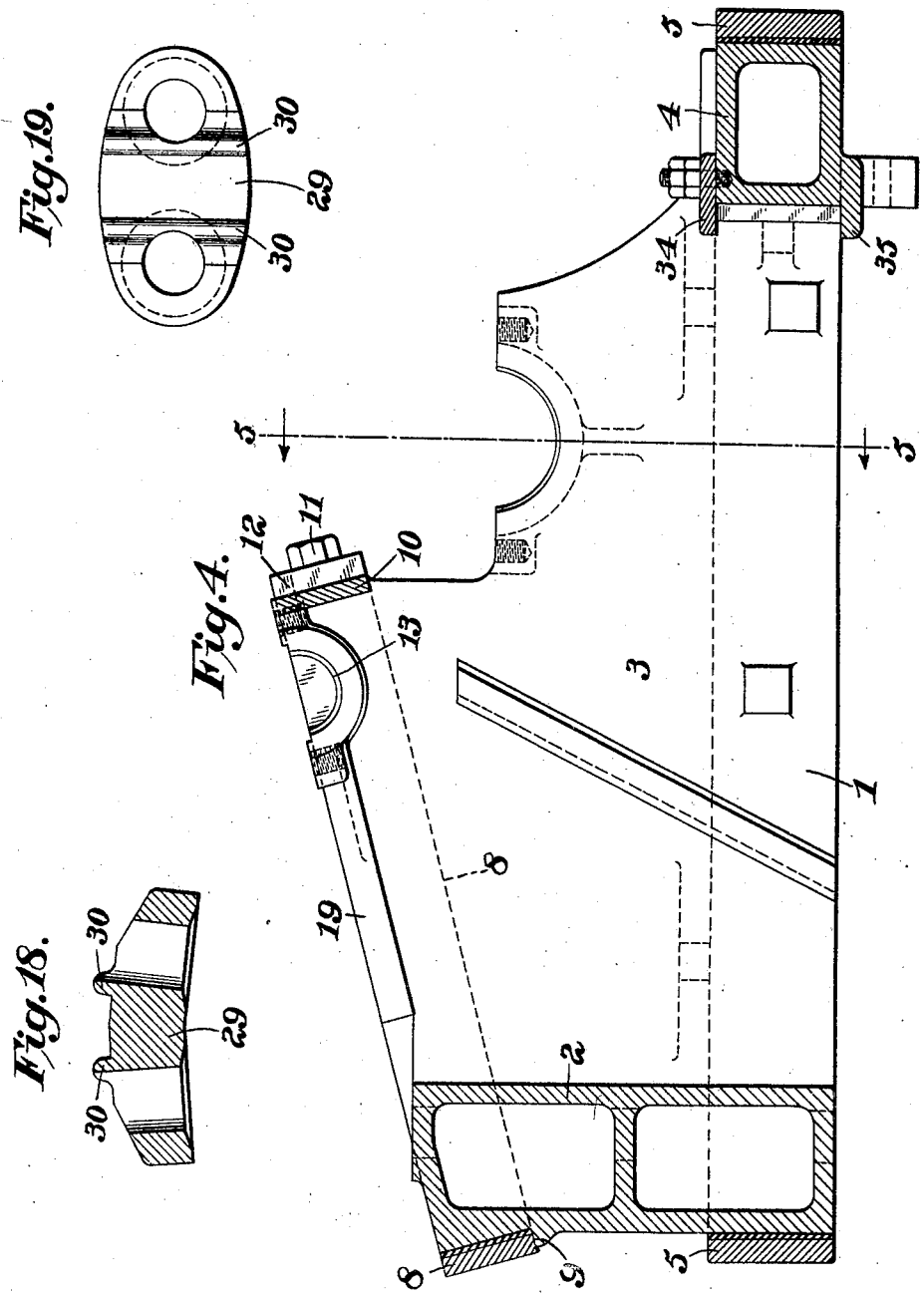

Mar. 3, 1925.                                                    1,528,316
R. BERNHARD
CRUSHER
Original Filed Jan. 18, 1919    7 Sheets-Sheet 5
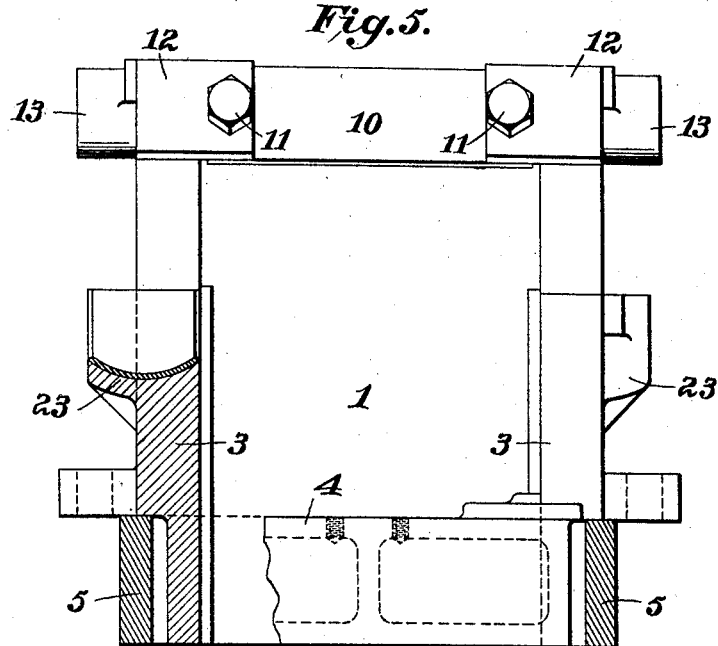
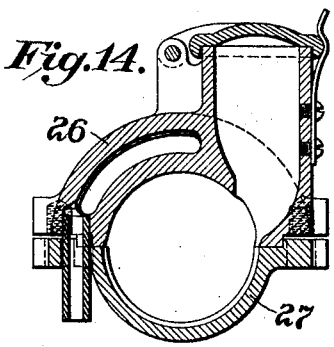
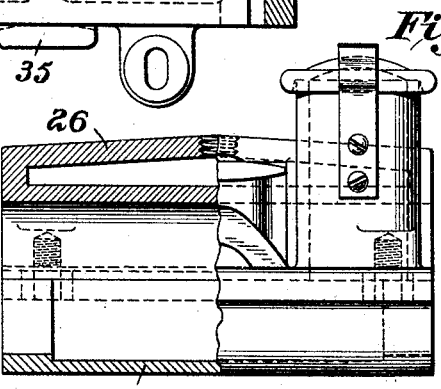
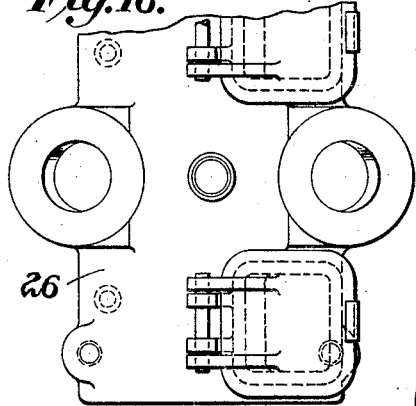
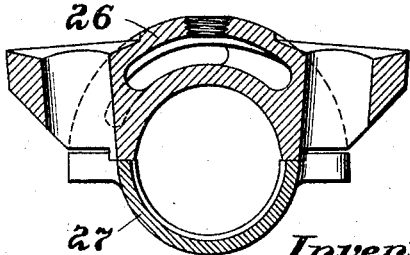
Inventor:
Richard Bernhard
by Spear, Middleton, Donaldson & Spear
Attys.

Mar. 3, 1925.                                                              1,528,316
                           R. BERNHARD
                              CRUSHER
                   Original Filed Jan. 18, 1919    7 Sheets-Sheet 6
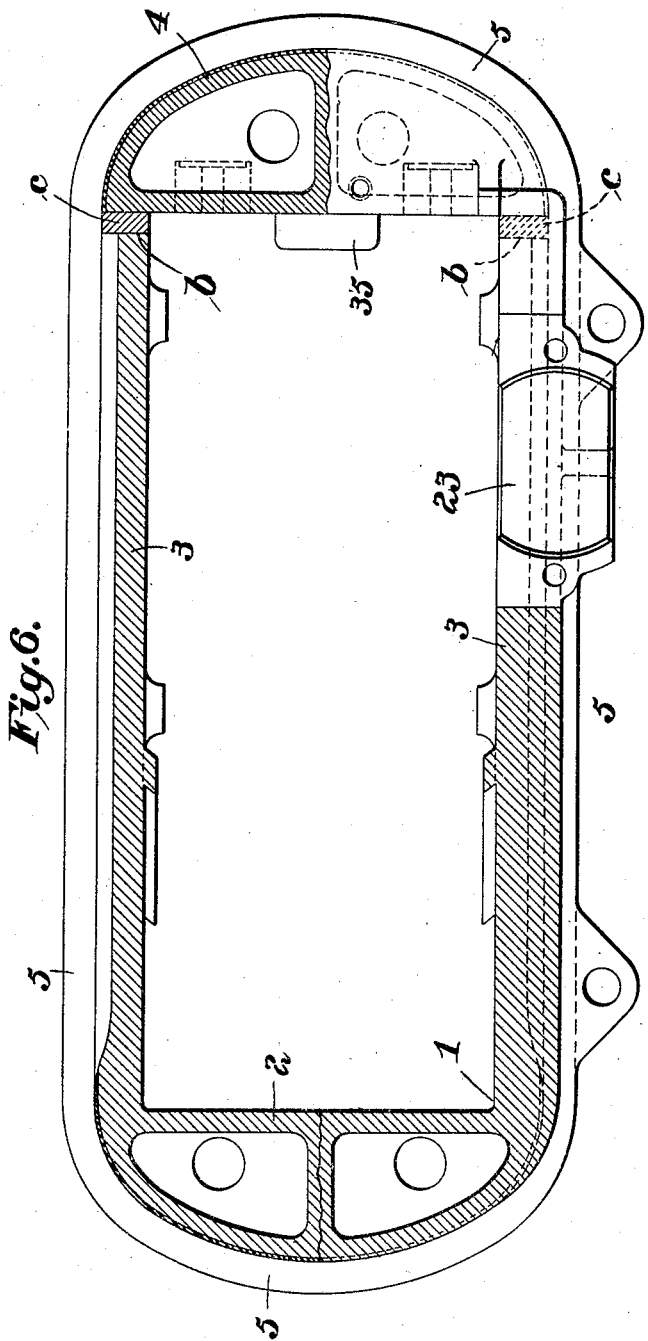
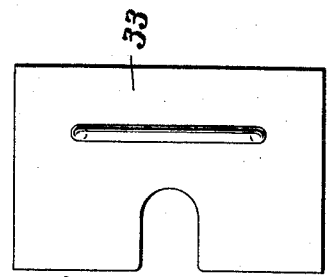
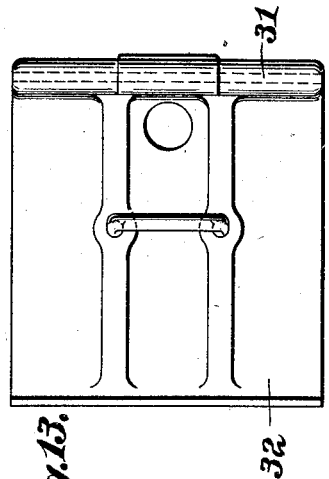
Inventor:
Richard Bernhard,
by Spear, Middleton, Donaldson & Spear
          Atty's.

Mar. 3. 1925. 1,528,316
R. BERNHARD
CRUSHER
Original Filed Jan. 18, 1919 7 Sheets-Sheet 7
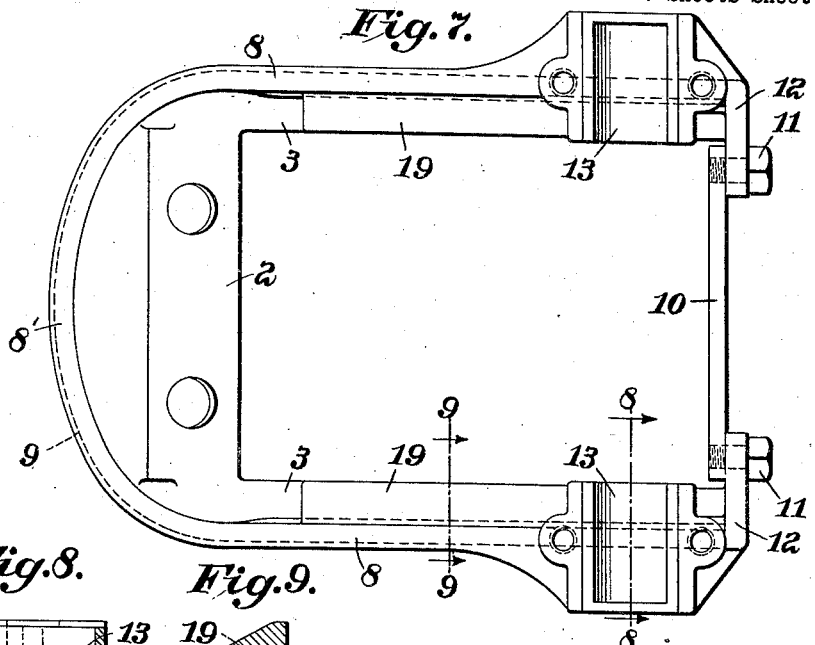
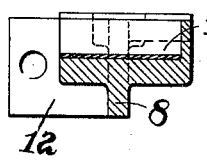
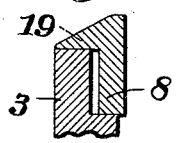
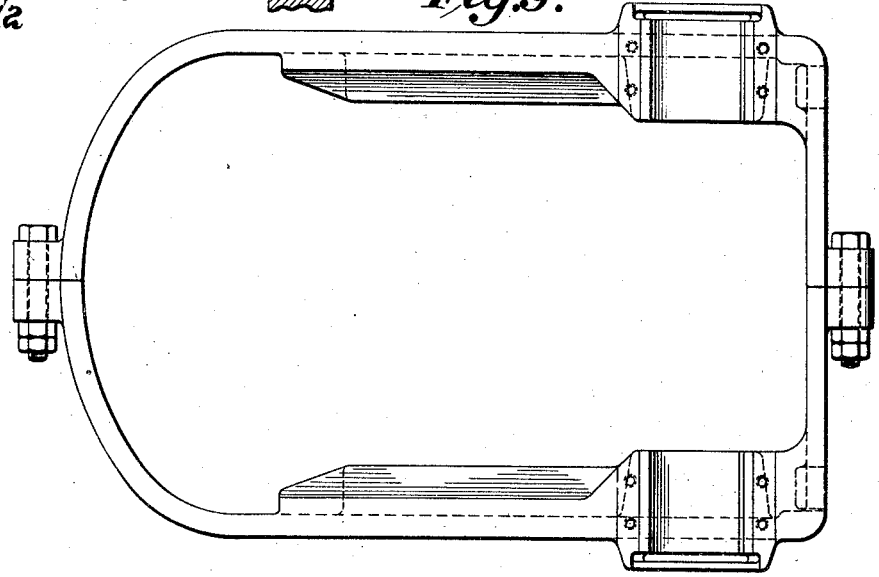
Inventor:
Richard Bernhard.
by Spear, Middleton, Donaldson & Spear
Attys.

Patented Mar. 3, 1925.

1,528,316

UNITED STATES PATENT OFFICE.

RICHARD BERNHARD, OF ALLENTOWN, PENNSYLVANIA, ASSIGNOR TO TRAYLOR ENGINEERING AND MANUFACTURING COMPANY, OF ALLENTOWN, PENNSYLVANIA, A CORPORATION OF DELAWARE.

CRUSHER.

Application filed January 18, 1919, Serial No. 271,850. Renewed December 3, 1924.

*To all whom it may concern:*

Be it known that I, RICHARD BERNHARD, a citizen of the United States, and resident of Allentown, Pennsylvania, have invented certain new and useful Improvements in Crushers, of which the following is a specification.

One object of the invention is to provide a crusher of economical and durable construction and in which the main frame is made comparatively light and is reinforced by members, such as steel links which embrace the frame and resist the stresses to which the machine is subjected.

Further objects of the invention will be clear from the following description.

The invention consists in the features and combination and arrangements of parts hereinafter specified and particularly pointed out in the appended claims.

In the accompanying drawings:

Figure 1 is a central vertical sectional view of the crusher.

Fig. 1ª is a detail of a removable wear plate.

Figure 3 is a plan view of the crusher.

Figure 4 is a vertical sectional view of the frame and the reinforcing links.

Figure 5 is a part vertical sectional view on the line 5—5 of Figure 4 looking from the right.

Figure 6 is a horizontal sectional view of of the frame with the lower link in place.

Figure 7 is a plan view of the upper link and a part of the frame.

Figure 8 is a sectional view on the line 8—8 of Figure 7.

Figure 9 is a sectional view of Figure 7 on the line 9—9.

Fig. 9ª is a plan view of a modified form of upper link.

Fig. 9ᵇ illustrates rounded upper and lower bearings for the rear toggle block.

Figure 10:
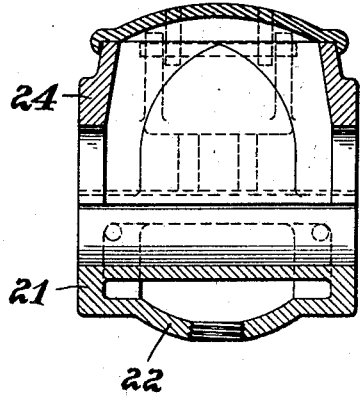
Figure 11:
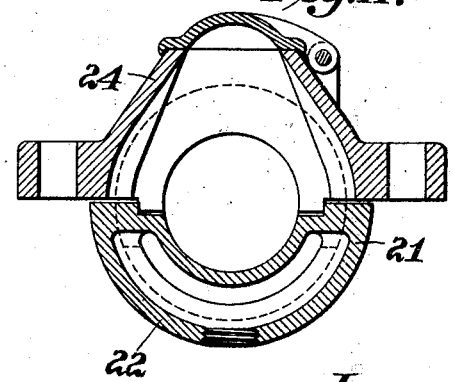

Figures 10 and 11 are detail views of the eccentric shaft bearing.

Figure 12 is a plan view of the short toggle.

Figure 13 is a plan view of the long toggle.

Figures 14, 15, 16 and 17 are detail views of the pitman head or cap.

Figures 18 and 19 are views of the pitman rocker block.

In these drawings 1 indicates one of the main frame parts which is of cast metal having an upstanding end wall 2 and sides 3, (Figures 4 and 6) formed in one piece, said main frame also including a rear abutment portion 4 formed separately from said side walls 3 but extending across from wall to wall beyond the ends thereof and reaching to points substantially in the planes of the outer sides of the said walls 3. This abutment on its rear face like the front face of the upstanding front wall 2 is rounded and a steel link or band 5 having straight parallel sides and curved ends embraces this frame and the abutment, the link being at the lower part of the frame.

A second band or steel link, indicated generally by the numeral 8 in Figure 7, extends around the upper portion of the main frame, this link having parallel sides 8 and a rounded front end 8' the latter fitting around the outside of the top portion of the upstanding end wall 2. A shoulder is formed at 9 on which the link rests.

The other end of this link is formed by a cross piece 10 separate from the main body of the link, but bolted thereto, as shown at 11, the main portion of the link having inwardly extending lugs or projections 12 to which the cross piece 10 is bolted, as just mentioned. It will be understood that this band may be formed in one piece.

The lower halves of the bearings, as shown at 13 for the swing shaft 14, on which the crushing jaw 15 is hung, may be cast as a part of this link, so that the upper end of the jaw is supported by this link entirely.

This swing shaft is maintained in its bearings by a bearing cap 16 bolted to the link as at 17. The upper link also has inwardly projecting flanges 19 to protect the frame at each side of the crusher opening from wear of the material being operated on, so that the main frame will not be injured.

The eccentric shaft is indicated at 20 seated in two bearing members 21, which are provided with rounded or partly spherical bottoms 22 resting in corresponding shaped sockets 23 formed in the upper edges or faces of the sides of the main frames. These bearings are provided with caps 24 held in place by the stud bolts 25. The base portions of these bearings are water jacketed to insure cool running under the severest stresses. They may be made without the cooling means, however.

The pitman connection includes a cap 26, chambered for water circulation. It is provided with a bottom member 27, which serves to prevent the escape of lubricant and the entrance of grit to the bearings. The pitman also includes two or four rods 28, the preferable construction employing two such rods. These at their lower ends carry the pivot block 29, the rods passing through this block at each side of its center and having nuts 29′ on their lower ends with rounded or partly spherical upper surfaces fitting in correspondingly shaped sockets on the under face of the block. This block has a recess on its upper side formed by the projections 30 and the bottom of this recess is curved like the side of a cylinder, and this curved surface affords a bearing for the head 31 of the long toggle arm 32, the contact between these parts being such as to get a rocking movement of one relatively to the other as the eccentric shaft rotates and thus prevent sliding friction. These parts are made of steel and the cylindrical bearing surface of the rocker is described with a long radius in order to obtain as much bearing surface as possible. The projections 30 prevent displacement of the rocker and toggle lever in relation to each other. The pitman rods converge downwardly in order to provide as nearly as possible a pivot bearing and allow the parts to align themselves according to the stresses to which they are subjected.

It is preferred to pin the nuts on the pitman rods, as shown, to make them non-adjustable and prevent breakage due to improper setting of the rods, but the rods may be adjustable so that the angularity of the toggles may be varied to suit the degree of motion to be obtained in the jaw.

The pitman rods may be made to serve as safety devices to protect the apparatus against serious breakage in its more valuable parts, because the rods can be made of such size as to only withstand crushing strains up to a certain degree. When this is exceeded the rods will break. They can be readily replaced. The short toggle 33 engages the long toggle 32 directly over the rocker or pivot block, the head 31 of the long toggle being recessed on its face to receive the end of the short toggle. The bearing or contact between the two toggle arms is a rolling one instead of a pivoted one, the end of the short toggle being of cylindrical form to prevent sliding friction and the shape of the rolling surfaces being developed in each design with a view to obtain the necessary movement of the jaw and have the compression stresses pass through the body of the toggles. Removable wear plates are provided at the ends of the toggles. In larger crushers these will be of angle shape, a shimming plate being used opposite the short leg of the angle to reduce the back or lost motion and better confine the toggles in their seats. The shimming plate will be adjustable by means of shims or washers so that the toggles will have very little freedom vertically.

The recesses in which the toggle ends fit are slightly flared, the walls being curved.

The rolling bearings for the toggles is of advantage over a pivotal mounting because of less friction, it being necessary in the pivoted form to make the pivot bearings with a considerable radius, which results in a sliding or grinding movement. The pivoted toggle must be lubricated and as grit will get into the bearings rapid deterioration will result. In the present construction the stresses are carried by the rolling surfaces. There is little wear, no lubrication is necessary and any grit which enters these bearings escapes because there is no lubricant to gum up and retain the grit.

The toggle block 4ª which receives the thrust of the short toggle and which is formed separately from the main frame is held in place between upper and lower lugs 34, 35, at the central vertical axis of the crusher. This block may therefore adjust itself laterally to line up with the short toggle and the entire toggle system, including the abutment block, will line itself up with the toggle seat in the jaw. This results in perfect contact for the toggle bearings.

Shims of various thickness are provided to be inserted between the toggle block 4ª and the abutment 4 and thus the discharge opening at the bottom of the jaw can be made to suit the size of the product desired. A wedge adjustment may be used between the block 4ª and the main frame abutment 4.

The swing jaw is pulled back by means of two springs and rods 36, this being ordinary construction.

Heretofore the frames of the breakers were made either of cast iron in one piece or of cast steel. The larger crushers were made in sections, that is, the sides were made separate from the ends. The parts were fitted together and bolted. These sectional crushers were made of iron or steel. Cast iron could not be used on the very largest breakers because the parts became too heavy, and the crusher frame would have to be cut into many pieces, to make it possible to transport it in the ordinary manner. The larger breakers were, therefore, made of cast steel, which resulted in a much lighter crusher, but so far the results have not been entirely satisfactory where large steel castings have been employed, for the reason that the complicated steel casting is difficult to make. In all large and complicated castings shrinkage strains exist. These cannot be eliminated no matter how perfect the design, how suitable the materials may be for the steel castings and how careful the workmanship in making the mould and pouring the metal.

The construction hereindisclosed avoids the objections just noted, the main frame being of comparatively light cast iron reinforced by steel links or bands, one at the bottom and the other at the top where the greatest stresses occur.

In the smaller breakers, the lower band will be a steel forging. In the larger crushers, the forging would be difficult to make, and therefore, steel castings will be used. It will be seen that the band is of plain cross section, having no ribs, holes or sudden changes in cross section, which would cause shrinkage strains. Each link can, therefore, be made without any difficulty, resulting uniformly in perfect castings.

The sides of the lower link are parallel while the ends are elliptical, in order to subject the link to pure tensile stresses and avoid bending and shearing as much as possible. In the smaller and lighter crushers this link will be shrunk in place in the shop, the link always having an initial stress, due to the shrinkage, in excess of any working stresses the crusher will be subjected to. Due to this the cast iron frame will never be strained, because the link will suport it under the severest conditions. On the larger crushers the parts will have to be shipped separately, and the link will be assembled at destination, then heated on each side by means of torches or charcoal fire, and when expanded the proper amount of zinc will be poured in the gaps at each end, between the link and the frame as at Z, in order to obtain perfect and continuous bearing at the ends. When the link will have contracted, the frame will be in compression and the link will still have an initial strain the same as in the small crushers.

In the very largest breakers the frame will have to be made in four or more pieces, due to extreme size and weight. These parts will be properly bolted together, and the link then shrunk around them as described above, the function of the link being the same no matter how large the breaker.

It is not necessary to bolt the frame together, or make the rear abutment in the smaller breakers a part of the frame, because the link will sustain all of the tensile strains exerted by the toggles. I may elect to make the rear end separate in all crushers to have the lower link act as a safety device to protect the frame casting. In the event of failure of the link, the frame would not be damaged as the loose abutment would simply slide back.

The upper link need not be as heavy as the lower, because the stresses in this part of the crusher are not as severe. However, it can be made of any strength desired.

The upper link in case of extra heavy stress beyond that for which the main frame is calculated to withstand will give way before the main frame will rupture and the swing jaw will simply move back and thus the main frame will be insured against damage at its upper portion and as above intimated the lower link will protect, or insure, the lower part of the frame against rupture in a similar manner.

In the small crushers the links will be made of welded steel and will be shrunk in place. There will be interposed between the frame and the end piece of the links shims of the necessary thickness or molten metal may be employed to form a pad to obtain the desired tension within the link, so that the tension member will be under an initial strain. This will prevent the end piece from moving around.

Reverting to the self aligning character of the parts this refers to the shaft, pitman, swing jaw, toggles, and the back abutment for the toggles. Unless these parts are properly aligned hot bearings and breakage of the toggles will result.

In view of the fact that a stone crusher is usually operated by unskilled labor and is of more or less rough construction the parts as heretofore organized were seldom maintained in proper adjustment. In my construction to facilitate the setting up of the parts and maintain them in proper working order they are made self-aligning. There is no change in the swing jaw, it being hung at the top of the frame as heretofore. The back abutment for the toggles however can rock to align itself with the toggles because it is supported and guided only in the center. The parallel alignment of the abutment is obtained before shrinking in the lower links and is maintained by the shims interposed between the frame and end piece.

As shown in Fig. 9$^b$ the parts 34, 35 may be provided with rounded bearings at $a$, $a$ for the toggle block 4$^a$ to permit this block to align itself accurately in a vertical plane in respect to the toggle mechanism. In cases where the rear abutment 4 is made separate from the frame horizontal alignment may be secured in setting up the apparatus by placing a wedge piece between the swing jaw and the front fixed jaw to set the toggle mechanism and press the abutment 4 against the inner rounded surface of the rear end of the link and the parts thus having been set and the correct position of the abutment 4 determined suitable shims $c$ are forced into the spaces between the front face of the abutment at its ends and the shoulders *b* of the frame and the band 5 is then shrunk in place and the abutment 4 is properly positioned.

In cases where the rear abutment 4 is fixed to or is integral with the frame alignment of the parts in a horizontal plane can be effected by introducing a pad of zinc between the front face of the abutment and the rear face of the toggle block 4ª.

The link 5 is calculated to take the strain and if this breaks the rear abutment (when this is formed as a separate piece) will simply slide back.

In machines where the rear abutment at 4 is made as an integral part of the main frame if the link breaks under excessive strains the frame will break also and this break will naturally occur at the weakest point which in the construction shown would be near this rear abutment where the main frame is thinned down. Such breakage will not destroy the utility of the whole machine because with a new link the broken part can be put back in place and held by the link in substantially the same manner that the link holds the separate abutment member.

Reverting to the partly spherical bearings between the nuts which hold the upper and lower ends of the pitman rods and adjacent parts and reverting also to the partly spherical bearings at 22 of the shaft bearing members 21 it will be observed that this construction lends itself to a self adjustment of the parts to properly distribute the strain and take care of wear.

If one journal of the eccentric shaft or its immediate bearing wears faster than the other and the shaft assumes a position slightly out of true the bearing members will adjust themselves in their rounded seats so that the strains still will be taken by both journals and their immediate bearings and the pitman rods also will adjust themselves in the partly spherical seats at the nuts and will continue to exert their force upon the toggle without side stress.

Figure 1:
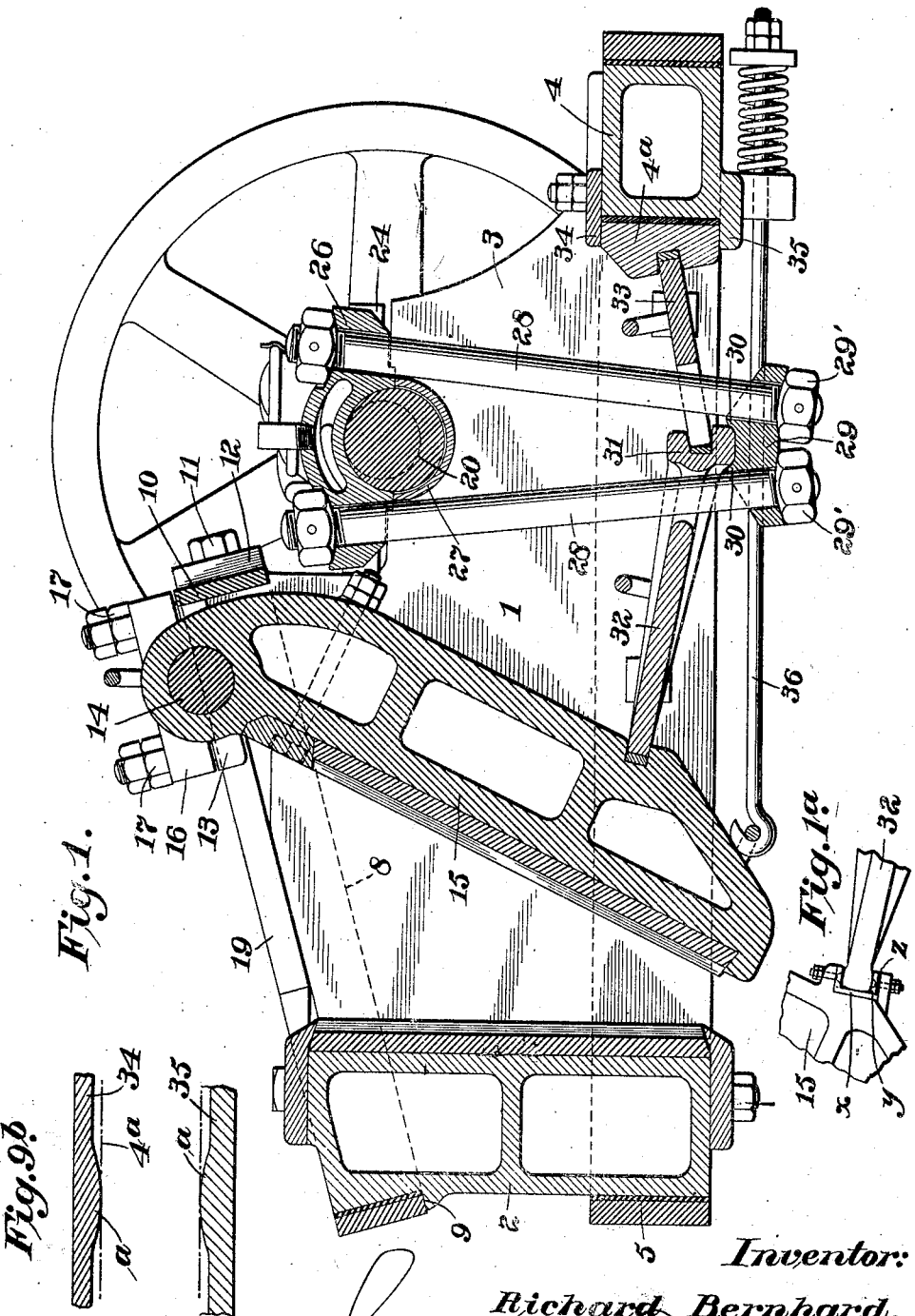
Figure 2:
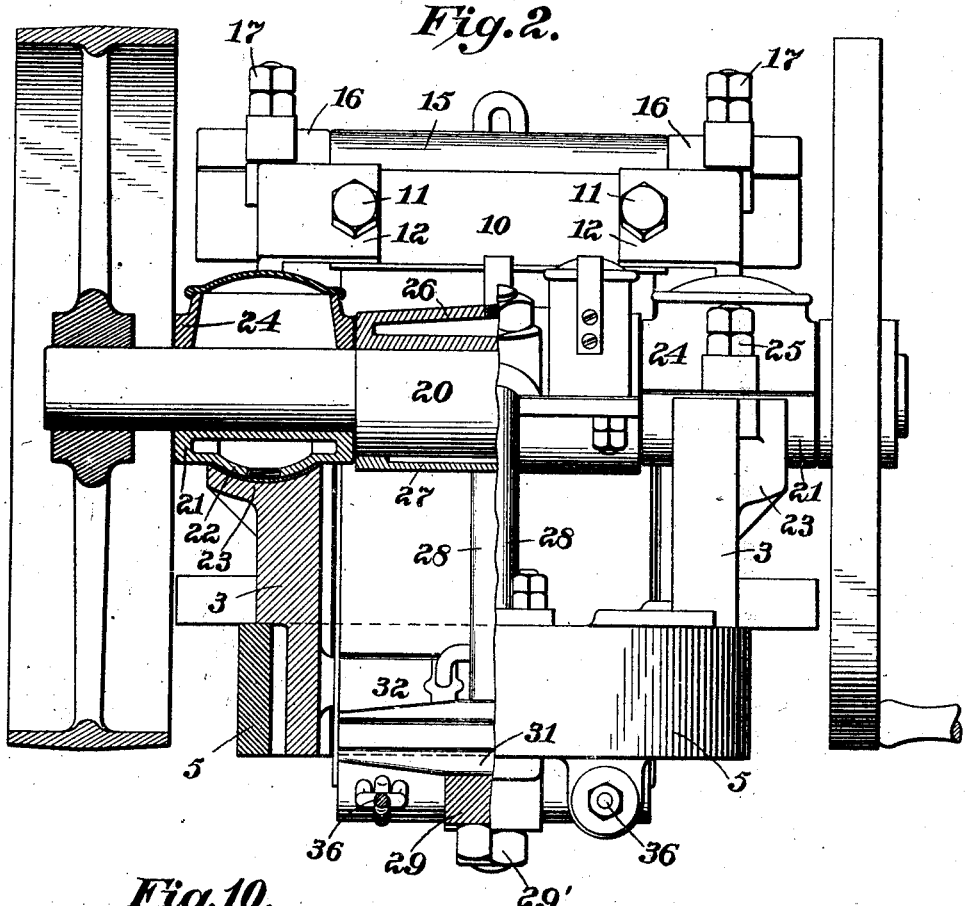
Figure 2 is a view looking from the right of Figure 1 with the parts at the right of the center line in elevation and the parts at its left of said line in section.

In Figure 1ª is shown removable wear plate means which may be used either between the swing jaw and the main toggle or between the toggles themselves or between the rear toggle and the abutment block.

This wear plate means consists preferably of an angle piece *x* and a member *y*, the latter fitting in front of the angle member, these members being held by countersunk bolts can be removed and replaced. The lower member *y* when worn can be adjusted to maintain its working face in the prescribed relation to the opposing working face on the angle member by introducing shims as indicated in Figure 1ª at *z*.

The holding bolts pass through a member *y* and the forwardly extending portion of the angle member *x*, leaving the substantially vertical portion of the angle member *x* intact throughout, this portion receiving the pressure and crushing stress from the toggle. This toggle has a rounded bearing surface to engage the wear pieces. The angle piece may be formed in two parts, if desired, consisting of the vertically extending portion with the forward extending portion separate therefrom, or in other words this construction would be duplicating the construction shown at the lower part of Figure 1ª, where the piece *y* fits in front of the portion *x*.

What I claim is:

1. A crusher comprising a comparatively light frame, a swing jaw, means for operating the swing jaw and a band embracing and reinforcing the upper part of the frame, said band carrying the bearings for the swing jaw substantially as described.

2. A crusher comprising a comparatively light frame having a fixed jaw, a swing jaw, means for operating the swing jaw, and a member extending around the front of the fixed jaw and having rearwardly extending arms with bearings for the swing jaw carried by said rearwardly extending arms, substantially as described.

3. In a crushing machine the combination of a sectional main frame, a swing jaw, toggle arms for operating the jaw, means for operating the swing jaw and a band or link embracing the frame, holding the parts thereof together and reinforcing the same, said band taking the strains resulting from the operation of the swing jaw by the toggle arms substantially as described.

4. In combination a crusher, a main frame having a fixed jaw, a swing jaw, a link extending around the fixed jaw, and carrying the bearings for the swing jaw, said link at its rear end engaging the frame, substantially as described.

5. In combination with a main frame, a swing jaw, said frame having a fixed jaw, a reinforcing band embracing the frame adjacent said jaws and having flanges projecting inwardly adjacent the opening between the jaws to protect the main frame from the wear of the material introduced between the jaws, substantially as described.

6. In combination in a crusher, a main frame, a swing jaw, means for operating the swing jaw, including an eccentric shaft, bearings for the eccentric shaft having a portion of substantially spherical form fitting in correspondingly shaped sockets in the main frame, and self-adjusting driving means between the eccentric shaft and the swing jaw, substantially as described.

7. In combination in a crusher, a shaft having an eccentric portion, self adjusting bearings for the ends of said shaft, toggle means, and a pitman having self adjusting bearings with the toggle means, said pitman having a self adjusting connection operated by the eccentric shaft, substantially as described.

8. In combination a frame, a shaft having an eccentric portion, bearings for the ends of the shaft having partly spherical lower surfaces bering in the frame, a swing jaw, supported by said frame, toggle arms, a pitman having a partly spherical bearing surface connection with the toggle arms, a member carried by the eccentric shaft and having a partly spherical bearing connection with the upper part of the pitman.

9. In combination in a crusher a main frame, a swing jaw supported by said frame, toggles between the swing jaw and the main frame in the form of broad plates bearing at their edges on the swing jaw and frame, an eccentric shaft, a pitman cap member and a pitman operated thereby, said pitman being connected with the toggles and consisting of a plurality of rods having partly spherical bearings, between its upper end and the cap member and between its lower end and the toggles to prevent side stress on said toggles, substantially as described.

10. In combination in a crusher a main frame, a swing jaw, a pair of toggle arms, one of which engages the swing jaw and the other the frame, one of said toggle arms having a recess in its end receiving the end of the other toggle arm, a pitman, a block below the meeting ends of the toggle arms having a socket with a rounded bottom providing rolling contact with one only of the toggle arms, said toggle arms having rolling bearing surfaces between them and having also rolling bearing surfaces between their ends and the swinging jaw and frame respectively, said pitman and block having a partly spherical bearing between them, substantially as described.

11. In combination with a main frame, a swing jaw, an eccentric shaft, toggle arms between the swing jaw and the main frame and a pitman comprising downwardly converging rods connected at their lower ends with the toggles and at their upper ends operated from the eccentric shaft through partly spherical bearings, so that displacement of the eccentric shaft will not cause undue stresses being imparted to the toggles, substantially as described.

12. In combination a main frame having a fixed jaw and an opposing abutment, a block fitting against the abutment and susceptible of self-adjustment, toggles between said block and the swinging jaw and a pitman for operating the toggles, substantially as described.

13. In combination with a main frame having a fixed jaw and an opposing abutment with upper and lower flanges adjacent the same, a swing jaw, a pair of toggle arms, one engaging the swinging jaw, a block held between said flanges and furnishing a backing for the other toggle and a pitman for operating the toggles, said flanges having bearings to allow the block to adjust itself in a vertical plane.

14. In combination, a crusher, a comparatively light main frame, a swinging jaw with means for operating the same, and a band or link encircling a portion of the main frame and having substantially parallel sides and an elliptical end portion, and a self-setting abutment comprising a cross piece extending from side to side of the main frame but separable relative thereto, said abutment cross piece having a curved face bearing on the inner side of the elliptical end portion of the band to center itself when pressed thereagainst, and means for holding the abutment in position after it has centered itself, substantially as described.

15. In combination, a crusher, a comparatively light main frame, a swinging jaw, with means for operating the same, and a band or link encircling a portion of the main frame and having substantially parallel sides and an elliptical end portion, and an abutment member comprising a cross piece extending from side to side of the main frame but separable relative thereto, said abutment member having a curved end conforming to and bearing on the elliptical end portion to center itself when pressed thereagainst, and shims arranged between the front face of the separate abutment member and shoulders on the main frame, substantially as described.

16. In combination a swing jaw, toggle means, a main frame having an abutment block separable from the main frame, means for holding the block to the frame to allow it to set itself in proper alignment with the toggle means, and shims arranged between the front face of the separable abutment block and the adjacent portion of the main frame.

17. In combination a main frame having a fixed jaw at one end and side portions cast in one piece, an abutment member at the opposite end of the frame from the fixed jaw comprising a cross piece separable from the main frame, a swing jaw, means for operating the swing jaw and a band or link embracing the frame with its fixed jaw and separable abutment member and serving to hold the abutment member in place against the reaction from said swing jaw and its operating means, by allowing said abutment to move back when the breaking point of said band is reached.

18. In combination a swing jaw, toggle mechanism, a frame portion having a rigid jaw, an abutment separable from said frame portion and receiving the thrust of the toggle mechanism and a band encircling the frame portion and abutment, said abutment being adjustable to secure proper alignment of the parts, substantially as described.

19. In combination a swing jaw, toggle mechanism, a frame portion having a rigid jaw, an abutment separable from said frame portion and receiving the thrust of the toggle mechanism and a band encircling the frame portion and abutment, said abutment being adjustable to secure proper alignment of the parts, the band having a curved portion at its end forming a bearing for the abutment which has a rounded face adjacent the curved part of the band.

20. In combination a main frame, a swing jaw, means for operating the same, and means for holding the swing jaw to its work adapted to be ruptured before the breaking point of the main frame is reached to allow the swing jaw to move back when rupturing stresses are exercised, substantially as described, said means carrying bearings in which the swing frame is mounted at its upper end, and a member carrying said bearings and embracing the forward part of the main frame.

21. In combination with a main frame, an eccentric shaft, a swing jaw, partly spherical bearings for the eccentric shaft, a pair of toggle arms, a pitman having a partly spherical bearing at its upper end forming part of the connection between it and the eccentric shaft, a block at the lower end of the pitman and with which the pitman has a partly spherical bearing connection, said block furnishing a support for the adjacent ends of the toggle arms and a self adjusting abutment at the rear of the toggles substantially as described.

22. In combination in a crusher, a main frame, having a fixed jaw, a swing jaw, toggle means for operating the swing jaw and a reinforcing band embracing the end portion of the main frame, said band being shrunk in place with a filler between itself and the end of the main frame substantially as described.

23. In combination with a crusher, a main frame, having a fixed jaw, a swing jaw, means for operating the swing jaw including toggles and an end abutment, and a reinforcing band embracing the rounded ends of the frame and abutment with a metallic filler between the said rounded ends and the ends of the band substantially as described.

24. In combination in a crusher, a main frame having a fixed jaw, a swing jaw, toggle means for operating the swing jaw, and a reinforcing band embracing a portion of the main frame, and a filling between the band and the frame, said filler consisting of poured metal, and the band being shrunk into place, substantially as described.

25. In combination, a main frame having a fixed jaw and an opposing abutment in a separate piece, and an encircling band, a block fitting against the abutment, a swing jaw, and toggle arms between the swing jaw and the block, said abutment and band having contacting surfaces which will permit the abutment to adjust itself in a horizontal plane, means for fixing the abutment in the position to which it adjusts itself, the said block having capacity to adjust itself in a vertical plane, substantially as described.

26. In combination a main frame having a fixed jaw and an opposing abutment in a separate piece, and an encircling band, a block fitting against the abutment, a swing jaw, and toggle arms between the swing jaw and the block, said abutment and band having contacting surfaces which will permit the abutment to adjust itself in a horizontal plane, means for fixing the abutment in the position to which it adjusts itself, the said block having capacity to adjust itself in a vertical plane, an eccentric drive member, self adjusting bearings therefor, and a pitman for imparting power to the toggle from the eccentric, said pitman being self-adjusting, substantially as described.

In testimony whereof I affix my signature.

RICHARD BERNHARD.